May 12, 1959  J. R. HOLLINS  2,886,743
SIGNAL SWITCH FOR AUTOMOTIVE VEHICLES
Original Filed Oct. 19, 1955  4 Sheets-Sheet 1

INVENTOR.
Jesse R Hollins
BY
ATTORNEY

INVENTOR.
Jesse R Hollins
ATTORNEY

May 12, 1959   J. R. HOLLINS   2,886,743
SIGNAL SWITCH FOR AUTOMOTIVE VEHICLES
Original Filed Oct. 19, 1955   4 Sheets-Sheet 3

INVENTOR.
Jesse R Hollins
BY
ATTORNEY

May 12, 1959   J. R. HOLLINS   2,886,743
SIGNAL SWITCH FOR AUTOMOTIVE VEHICLES
Original Filed Oct. 19, 1955   4 Sheets-Sheet 4

United States Patent Office 2,886,743
Patented May 12, 1959

---

2,886,743

SIGNAL SWITCH FOR AUTOMOTIVE VEHICLES

Jesse R. Hollins, Brooklyn, N.Y., assignor, by mesne assignments, to Abraham Hollins and Jesse R. Hollins, Brooklyn, Lewis S. Hollins, Great Neck, and Theodore D. Davidson, New York, N.Y.

Continuation of application Serial No. 541,488, October 19, 1955, now Patent No. 2,812,396, dated November 5, 1957. This application September 9, 1957, Serial No. 682,670

5 Claims. (Cl. 315—77)

This invention relates to signal switches for automotive vehicles and, more particularly, to a novel combination directional and flare signal switch construction including a novel interlocking relation of the directional and flare switch functions.

In my prior United States Patents Nos. 2,607,840 and 2,607,864, I have shown and described a directional signal switch arrangement for utilizing the usual vehicle marker lamps, such as the parking and stop lamps, as turn signal lamps. In addition, the arrangement includes a flare signal switch which, when operated, connects all of such marker lamps to a flasher to signal an emergency stop.

The present invention is directed to an improved construction of a switch of this general type incorporating a novel interlocking arrangement between the operators of the directional signal switch and of the flare signal switch, and further including a novel pilot lamp arrangement for both switches.

More particularly, the flare signal operator cannot be latched in an operative position unless the directional signal operator is in the neutral or "off" position. Furthermore, when the flare signal operator is moved to the operated position and latched therein by the direction signal operator, the flare signal operator is released when the directional signal operator is moved to signal a turn.

The importance of this is as follows: In the first place, it is at least undesirable and certainly anomalous to simultaneously signal both a turn and an emergency stop. More importantly, however, a vehicle making an emergency stop has, if at all possible, been pulled to the side of the road; the right side on a normal road and either the right or left side on a superhighway having a center dividing strip. Consequently, before pulling back onto the road, it is highly important to signal other vehicles of a proposed "pull out" into a traffic lane. The invention switch assures this "pull out" signal by permitting the emergency stop signal to be terminated responsive to initiation of a turn signal.

The novel pilot lamp arrangement includes a lamp arrangement including a lamp bulb mounted on the directional signal operator and cooperable with any one of three colored lenses or aspects mounted in spaced relation on a fixed cover plate of the switch. The pilot lamp bulb is aligned with a different one of these lenses in each of the neutral and two operated positions of the directional signal operator, and this lamp bulb is energized whenever either the directional signal operator or the flare signal operator is moved to an operated position.

While not limited to use therewith, the signal switch of this invention is particularly designed for use in a signaling system of the type in which the signal switch is interposed between the headlamp control switch and the parking and tail lamps and between the brake-operated switch and the stop lamps, and in which, then the parking and stop lamps on one side of the vehicle are flashingly energized to signal a turn, the tail lamp on said side of the vehicle is extinguished to accentuate the turn signaling effect.

For an understanding of the invention principles, reference is made to the following description to a typical embodiment thereof as illustrated in the accompanying drawing. In the drawing.

Figure 1:
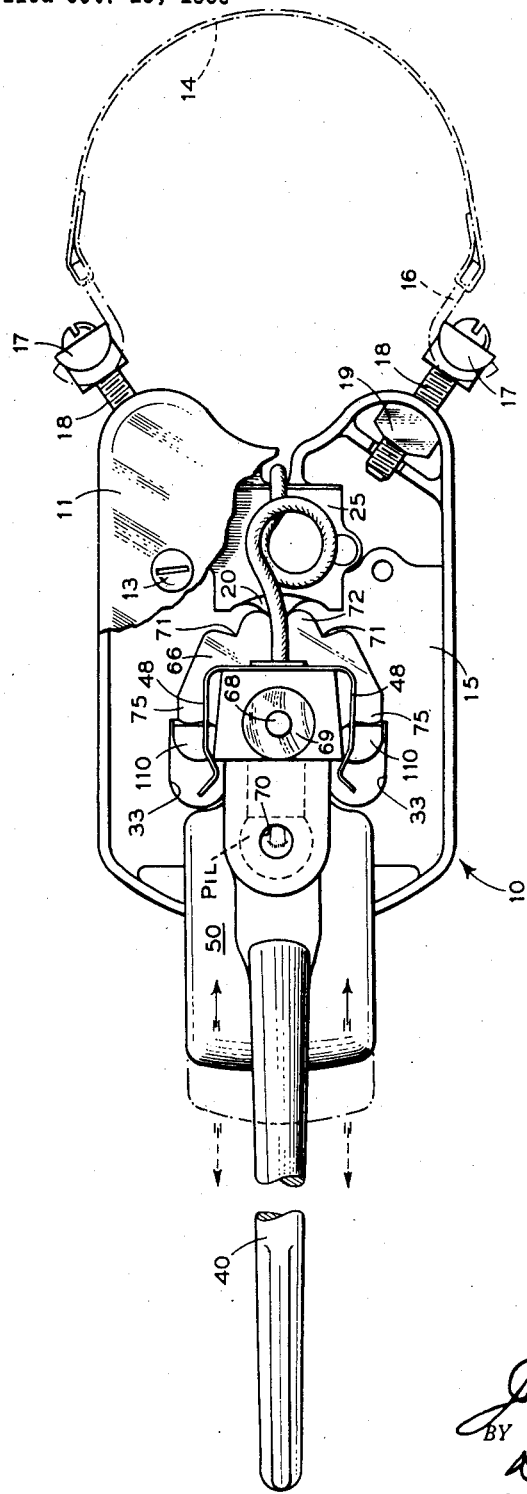
Fig. 1 is a plan view of a signal switch embodying the invention with the cover partially broken away to illustrate the switch internals.

Referring to the drawings, the signal switch 10 is illustrated as including a central base or housing member 15, a removable top cover 11, and a removable bottom cover 12, the covers being detachably secured to housing 15 by bolts 13 engageable in threaded openings in the housing. The housing and covers may be stamped or die cast from suitable metal and given an appropriate exterior finish.

The switch is arranged to be secured to the steering column by a clamp including a strap 14 wrapped around the column and having its ends inserted through slots in hooks 16 and bent up on the inside of the strap so that, when the clamp is tightened, the bent ends will be pressed against the column to afford a firm grip for the clamp. Hooks 16 engage beneath cross bars 17 slidable on screws 18 threaded into internal protuberances 19 in base 15. It will be noted that the inner ends of the base and covers are suitably recessed to fit the steering column.

Center housing 15 has an intermediate horizontal wall 21 from which extends an upwardly projecting pin or trunnion 22. Beneath wall 21 are a pair of longitudinal recesses or pockets 23 separated by a central partition and having end walls 26 and 27, wall 26 being joined to rim 28 by a ledge 24. A longitudinally recessed pocket 29 on the upper surface of wall 21 receives a slidable cam follower 20 held in position by a retainer 25 secured to housing 15. A spring 31 engaging follower 20 and a flange 32 on housing 15 biases follower 20 outwardly, this spring lying in the recess in pocket 29. Housing 15 has a pair of elongated openings 33 each aligned centrally of a recess or pocket 23.

The recesses 23 are closed by a dielectric contact plate 30 extending across both recesses and secured by screw 34 to ledge 24, the opposite end of plate 30 being held in position by bottom cover 12. The latter is formed with a trough portion 36 receiving a cable 35 containing the conductors connecting switch 10 to the marker or signal lamps. The head-lamp control switch, the brake-operated switch, and flasher, all as described more fully hereinafter.

The cable conductors are connected to terminals 41—47 on the underside of plate 30. Of these terminals, as viewed in Fig. 2, terminal 43 is behind and obscured by terminal 42 and terminal 47 is behind and secured by terminal 46. Terminal 41 is part of an elongated conductor strip extending across plate 30 and connected to four contacts 51. Terminals 42 and 43 are each connected to a single contact 52 or 53, respectively, laterally aligned with each other. Terminal 44 has a pair of laterally aligned contacts 54 connected thereto. Terminal 45 is part of an elongated U-shape conductor strip extending across plate 30 and having a contact 55 at each end laterally aligned with contacts 54. Terminal 46 has a single contact 56 connected thereto and laterally aligned with contacts 57 on each end of a lateral conducting strip of which terminal 47 forms a part. The several contacts are arranged for selective interconnection by contact springs carried by a pair of circuit closers each slidably mounted in a recess 23 and held therein by plate 30.

Figure 2:
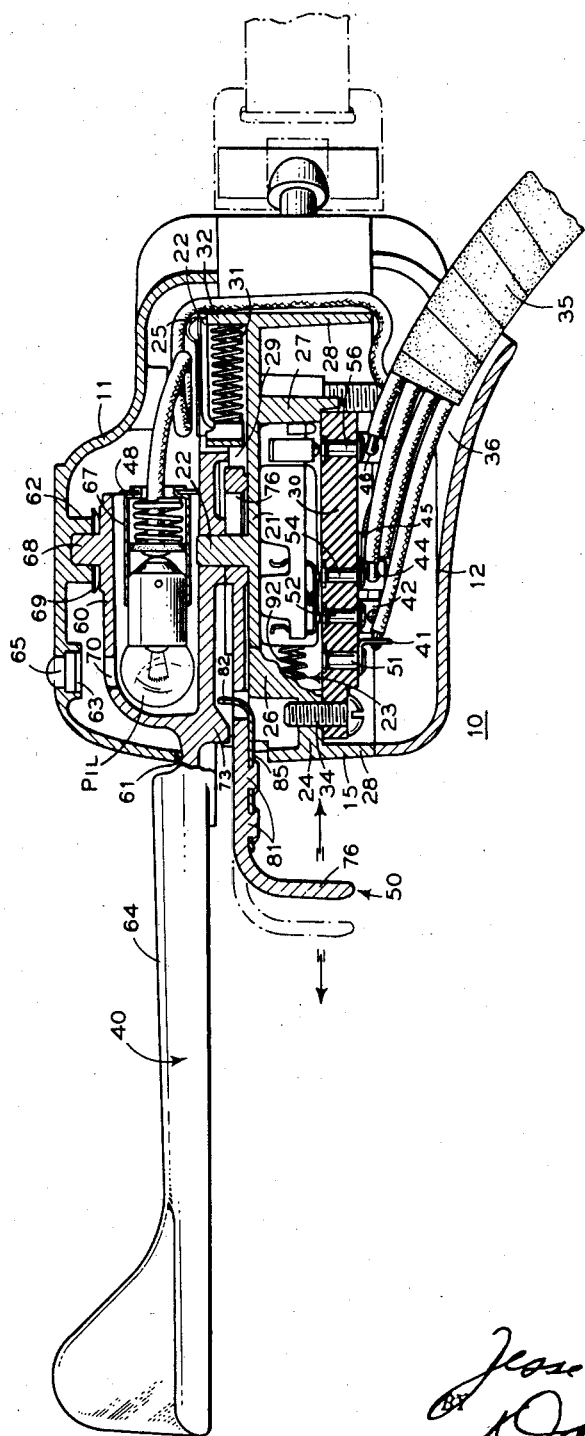
Fig. 2 is a longitudinal sectional view through the switch assembly.
Figure 3:
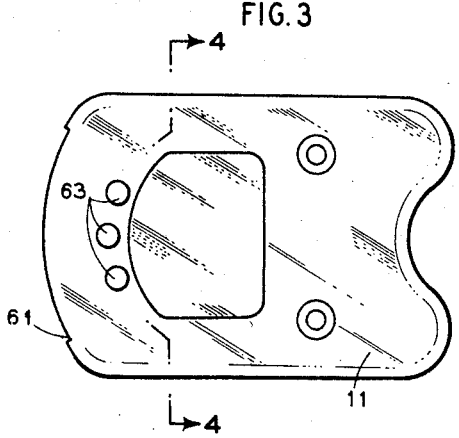
Fig. 3 is a plan view of the cover.
Figure 4:
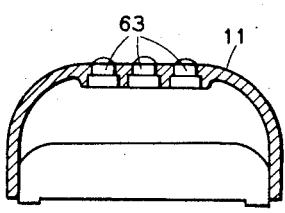
Fig. 4 is a sectional view on the line 4—4 of Fig. 3.
Figure 5:
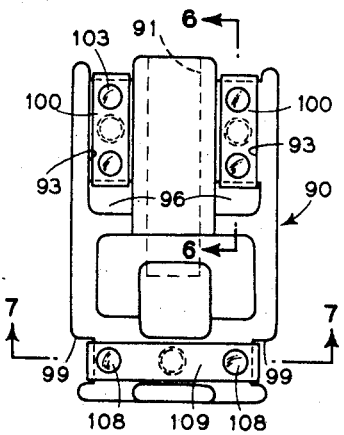
Fig. 5 is a bottom plan view of one of a pair of circuit controllers included in the switch assembly.
Figure 6:
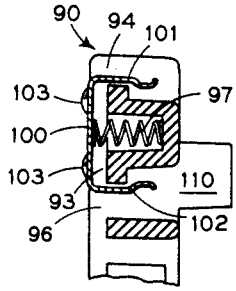
Figs. 6 and 7 are sectional views on the correspondingly numbered lines of Fig. 5.
Figure 7:
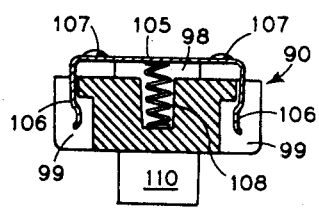

A proposed turn is signalled by operation of a turn signal lever or operator 40 to the right or left which is pivoted conjointly in housing 15 and top cover 11. As best seen in Figs. 2, 3 and 4, cover 11 has a slot 61 in its outer wall and a hollow trunnion 62 projecting downwardly from its upper wall. Near the forward wall of cover 11, the top wall is formed with three reinforced openings 63 arranged on an arc centered on trunnion 62. Openings 63 receive colored lenses or aspects 65, of which the two outermost may be green and the central one red. Various colors independently or in combination may be used.

Operator 40 comprises a housing portion 60 from which the lever portion 64 projects outwardly through slot 61 and a cam portion 66 projects inwardly. Housing portion 60 is arranged to mount a bayonet type lamp socket assembly 67 in which is mounted a pilot lamp PIL aligned beneath an opening 70 which is the same distance from trunnion 62 as the openings 63 so that lamp PIL will illuminate a lens 65 in each position of operator 40. Assembly 67 is held in position by a spring clip 48 embracing housing position 60.

The top wall of housing portion 60 has a pin 68 seating in trunnion 62 and embraced by a spring washer 69. The lower wall of housing portion 60 has an opening receiving pin 22 on wall 21 of base 15.

Cam portion 66 is generally flat and wide, and its rear edge has three generally V-shape notches 71 separated by curved lobes 72. Notches 71 are engaged by cam follower 20 in each position of operator 40 to releasably latch the operator in each position due to the pressure exerted on cam follower 20 by spring 31. For a purpose to be described, cam portion 66 has a pair of laterally projecting ears or wings 75 whose outer surfaces are substantially aligned laterally with pin 68. Just inwardly of slot 61, operator 40 has a narrow depending lip 73 having an abrupt outer edge and a sloping inner edge. This lip forms part of the latching arrangement for flare signal operator 50.

Figure 8:
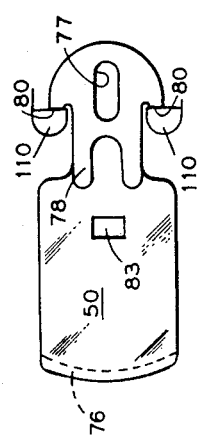
Fig. 8 is a bottom plan view of the flare signal operator.

Referring to Figs. 1, 2 and 8, operator 50 is a generally flat metal member having a downwardly curved outer grip portion 76 and a reinforced elongated central slot 77 near its rear end embracing pin 22. Bearing surfaces 78 extend forwardly from the reinforcement of slot 77. Near its rear end, operator 50 has a narrowed portion providing ears or wings 80 for a purpose to be described.

Operator 50 has secured thereto a curved leaf spring 85 cooperable with lip 73. Spring 85 includes a flat portion, having apertures receiving abutments 81 on the under side of operator 50, and a curved lip 82 projecting upwardly through a slot 83 in the operator. In the neutral position of operator 40, lip 73 is in the path of lip 82 of spring 80 so that, if operator 50 is pulled outwardly, lip 82 rides over lip 73 and latches operator 50 in the operated position. Due to the abrupt outer face of lip 73, operator 50 cannot be pushed back. When operator 40 is moved to signal a turn, lip 73 moves away from lip 82, clearing operator 50 for a return to its "off" position.

Operators 40 and 50 control the signal lamps through a pair of circuit closers 90 mounted in recesses 23. These circuit closers are substantially rectangular elongated blocks each having an elongated central recess 91 in its outer end and seating a coil spring 92 bearing against rim 28 of housing 15. On either side of a central portion containing recess 91, each block has a longitudinal recess 93 in its under surface connecting an end notch 94 and a slot 96. Each recess 93 seats the intermediate portion of a contact strip 100 having bent ends 101, 102 extending into notch 94 and slot 96, respectively, the contact springs carrying buttons or pimples 103. A coil spring 97, seated in a recess in each block, engages each strip 100 to bias the latter outwardly to the limit permitted by bent ends 101, 102. At its rear end, each block 90 has a transverse groove 98 in its under surface connecting notches 99. Grooves 98 receive contact strips 105 having bent ends 106 engaged in under cut notches 99 and limiting outward movement of strip 105 under the bias of a coil spring 108 seated in a recess in the block 90. Strip 105 has a pair of pimples or buttons 107.

In the inner position of each circuit closer 90, one strip 100 interconnects contacts 52 and 54 and the other strip 100 interconnects contacts 53 and 55, and strip 105 interconnects contacts 56 and 57. In the operated or outer position of each circuit closer 90, contact strips 100 connect contacts 51 to contacts 52 and 53, disengaging contacts 54 and 55, and strip 105 disengages contacts 56 and 57.

Circuit closers 90 are moved to the operated position by means of operators 40 or 50. For this purpose, each circuit closer has an upwardly projecting abutment 110 on its upper surface near its outer end and projecting through a slot 33. The rear surfaces of abutments 110 are in engagement with wings 75 on operator 40 and wings 80 on operator 50. When operator 40 is swung to either position, a wing 75, engaging an abutment 110, moves a circuit closer 90 to the operated position, compressing spring 92 which thus helps to restore operator 40 to the neutral position. When operator 50 is pulled outwardly, both circuit closers 90 are moved to the operated position by ears 80 engaging abutments 110.

Figure 9:
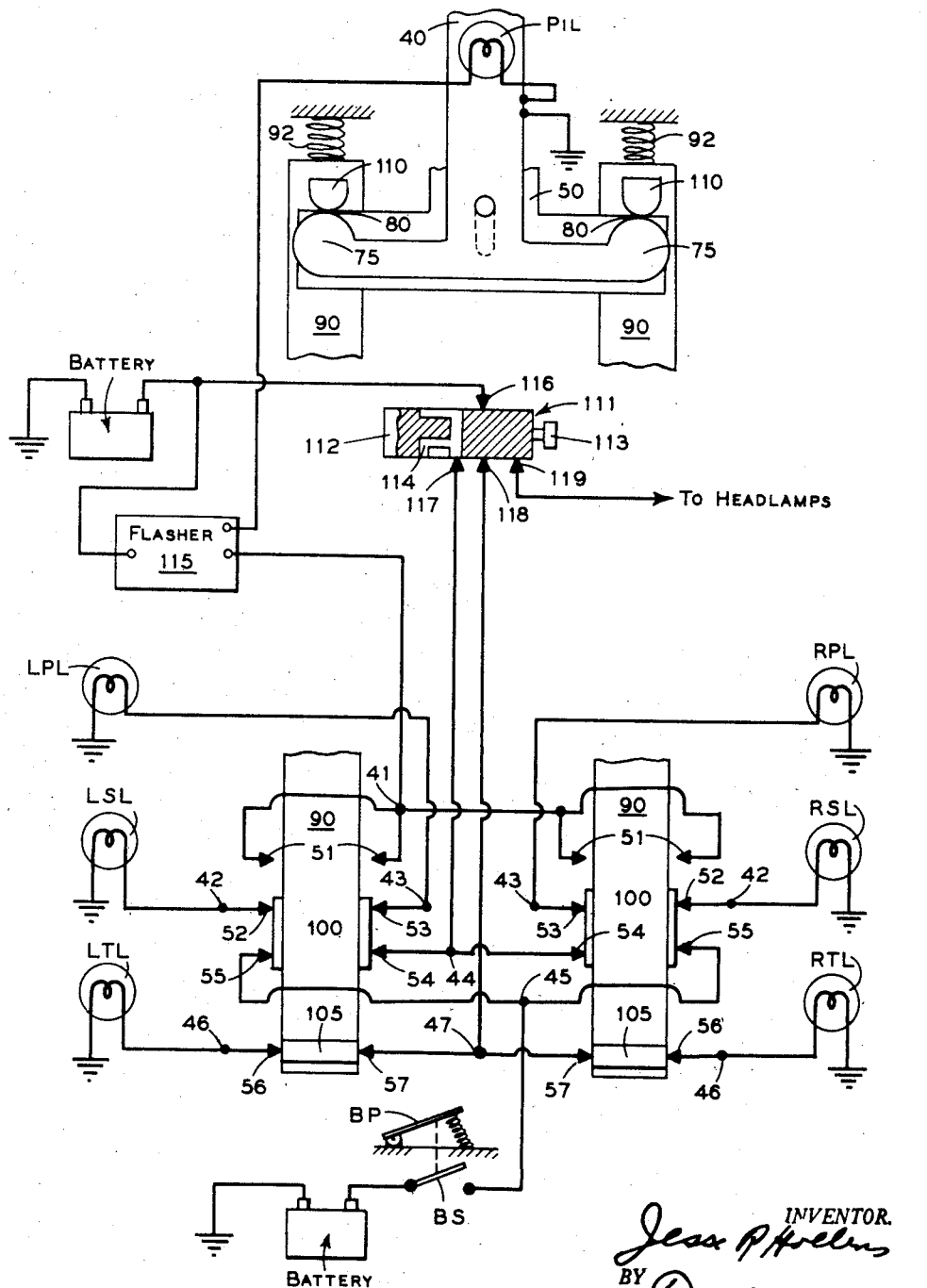
Fig. 9 is a schematic wiring diagram of a vehicle signal lamp system incorporating the invention switch.

The operation of the switch will be understood by reference to Figs. 1, 2 and 9. A headlamp control switch is shown at 111 as including a dielectric element 112 longitudinally slidable by means of a knob 113 and carrying a contact bar or strip 114. In the "off" position of switch 111, strip 114 engages only parking lamp tap 117. In either of a pair of "on" positions of switch 111, strip 114 engages a contact 116 connected to the usual grounded vehicle battery. In the first "on" position, for lighting the parking and tail lamps, strip 114 connects contact 116 to parking lamp contact 117 and tail lamp contact 118. In the second "on" position, for lighting the headlamps, strip 114 connects contact 116 to tail lamp contact 118 and headlamp contact 119.

Parking lamp contact 117 is connected to terminal 44 of switch 10 and thus to switch contacts 54. Tail lamp contact 118 is connected to contacts 57 through terminal 47. A flasher 115 is connected between the battery and terminal 41. Within this flasher, an armature (not shown) is provided for intermittently connecting pilot lamp PIL to the battery whenever the flasher is energized. Stop lamp switch BS, closed whenever brake pedal BP is operated, is connected between the battery and terminal 45. Contacts 53 are connected to the parking lamps LPL and RPL through terminals 43. Contacts 52 are connected to the stop lamps LSL and RSL through terminals 42. Contacts 56 are connected to the tail lamps LTL and RTL through terminals 46.

In the off or neutral positions of operators 40 and 50, circuit closers 90 occupy the illustrated positions in which strips 100 connect contacts 52 to contacts 55, and contacts 53 to contacts 54, and strips 105 connect contacts 56 to contacts 57. In this position, the parking and tail lamps are under the normal control of switch 111, and the stop lamps are under the control of switch BS.

When operator 40 is moved to signal a turn in one direction, "one" closer 90 is moved to the operated position and the "other" closer remains in its "off" position as illustrated. The closer 90 moved to its operated position will position its strips 100 to connect contacts 52 and 53 to contacts 51. This energizes flasher 115 to flash the parking and stop lamps on one side of the vehicle and to flash pilot lamp PIL which, through opening 70 in housing 60 will "flash" the lens 65 corresponding to the operated position of operator 40. Strip 105 will disengage contacts 56 and 57, thus extinguishing the tail lamp on such "one" side of the vehicle. All the lamps on the opposite or "other" side of the vehicle remain under control of switches 111 and BS. If operator 40 is moved to signal a turn in the other direction the "other" closer 90 is moved to its operative position while the "one" closer remains in its "off" position, the lamps on the "one" side of the vehicle remaining under control of switches 111 and BS.

Should operator 50 be pulled out (when operator 40 is in the neutral position) both closers 90 are moved to the operated position. All the parking and stop lamps, as well as pilot lamp PIL, are flashed, and both tail lamps are extinguished. Pilot lamp PIL "flashes" the middle lens 65. As stated, operator 50 is latched in the operated position until operator 40 is moved to a turn signaling position. When lip 73 releases lip 82, springs 92 return closers 90 to the normal position, thus retracting operator 50 through ears 80 and abutments 110.

This is a continuation of Serial Number 541,488, filed October 19, 1955, now U.S. Patent No. 2,812,396.

While a specific embodiment of the invention has been shown and described in detail to illustrate the application of the invention principle, it will be understood that the invention may be embodied otherwise without departing from such principle.

What is claimed is:

1. A signal switch assembly for automotive vehicles comprising, in combination, a housing; a pair of circuit closers mounted in said housing for movement between normal and operated position; two pairs of contacts mounted in said housing; a pair of contact strips, each carried by one of said circuit closers and associated with a different one of said pairs of contacts; each contact strip, in the normal position of its associated circuit closer, interconnecting the contacts of its associated pair and, in the operated position of its associated circuit closer, disengaging the contacts of its associated pair; means biasing each circuit closer to its normal position; a turn signal operator pivotally mounted in said housing for movement between a neutral position and either of a pair of turn signalling position, said operator engaging said circuit closers and being operable, upon movement to a selected one of said turn signaling positions, to move a selected one of said circuit closers to the operated position; a flare signal operator slidably mounted on said housing for movement between an ineffective position and a flare signaling position, said flare signal operator engaging said circuit closers and, upon movement to the flare signaling position, moving both of said circuit closers to the operated position; means biasing said flare signal operator to its ineffective position; and interengageable latch means on said two operators effective, upon movement of said flare signal operator to the flare signaling position with said turn signal operator in its neutral position, to latch said flare signal operator in its flare signaling position; said latch means being releasable upon movement of said turn signal operator to either of its operated positions.

2. A signal switch assembly for automotive vehicles comprising, in combination, a housing; a pair of circuit closers mounted in said housing for movement between normal and operated position; two pairs of contacts mounted in said housing; a pair of contact strips, each carried by one of said circuit closers and associated with a different one of said pairs of contacts; each contact strip, in the normal position of its associated circuit closer, interconnecting the contacts of its associated pair and, in the operated position of its associated circuit closer, disengaging the contacts of its associated pair; means biasing each circuit closer to its normal position; a turn signal operator pivotally mounted in said housing for movement between a neutral position and either of a pair of turn signaling position, said operator engaging said circuit closers and being operable, upon movement to a selected one of said turn signaling positions, to move a selected one of said circuit closers to the operated position; a flare signal operator slidably mounted on said housing for movement between an ineffective position and a flare signaling position, said flare signal operator engaging said circuit closers and, upon movement to the flare signaling position, moving both of said circuit closers to the operated position; means biasing said flare signal operator to its ineffective position; interengageable latch means on said two operators effective, upon movement of said flare signal operator to the flare signaling position with said turn signal operator in its neutral position, to latch said flare signal operator in its flare signaling position; said latch means being releasable upon movement of said turn signal operator to either of its operated positions; a cover secured to said housing and partly overlying said turn signal operator; indicator lamp lenses mounted in said cover at equal selected distances from the pivotal axis of said turn signal operator and aligned therewith in each of its operated positions; and an indicator lamp mounted on said turn signal operator at said selected distance from its pivotal axis for selective alignment with said lenses.

3. A signal switch assembly for automotive vehicles comprising, in combination, a housing; a turn signal operator pivotally mounted on said base for movement between a neutral position and either of a pair of turn signaling position; a flare signal operator slidably mounted on said housing for movement between an ineffective position and a flare signaling position; means biasing said flare signal operator to its ineffective position; switch means selectively and conjointly operable by said operators and each including a normally closed switch opened when the switch means is operated by one of said operators; and interengageable latch means on said two operators effective, upon movement of said flare signal operator to the flare signaling position with said turn signal operator in its neutral position, to latch said flare signal operator in its flare signaling position; said latch means being releasable upon movement of said turn signal operator to either of its operated positions.

4. A signal switch assembly as claimed in claim 1 including cam means releasably latching said turn signal operator in each of its positions.

5. A signal switch assembly for automotive vehicles comprising, in combination, a housing; a turn signal operator pivotally mounted on said base for movement between a neutral position and either of a pair of turn signaling position; a flare signal operator slidably mounted on said housing for movement between a ineffective position and a flare signaling position; means biasing said flare signal operator to its ineffective position; switch means selectively and conjointly operable by said operators and each including a normally closed switch opened when the switch means is operated by one of said operators; interengageable latch means on said two operators effective, upon movement of said flare signal operator to the flare signaling position with said turn signal operator in its neutral position, to latch said flare signal operator in its flare signaling position; said latch means being releasable upon movement of said turn signal operator to either of its operated positions; and means connecting the normally closed switch of each switch means in series between the headlamp control switch of the vehicle and a different one of the tail lamps of the vehicle for opening the tail lamp circuit on one side of the vehicle upon operation of said turn signal operator to signal a turn on such one side and opening both tail lamp circuits when said flare signal operator is moved to the flare signaling position.

References Cited in the file of this patent

UNITED STATES PATENTS

| | | |
|---|---|---|
| 1,612,560 | Balch | Dec. 28, 1926 |
| 1,716,370 | Dark | June 11, 1929 |
| 1,876,829 | Avakian | Sept. 13, 1932 |
| 2,623,935 | Young | Dec. 30, 1952 |
| 2,667,603 | Hollins | Jan. 26, 1954 |
| 2,812,396 | Hollins | Nov. 5, 1957 |